(12) United States Patent
Day et al.

(10) Patent No.: US 8,831,880 B2
(45) Date of Patent: Sep. 9, 2014

(54) ESTIMATING POSITIONS OF A DEVICE AND AT LEAST ONE TARGET IN AN ENVIRONMENT

(75) Inventors: Peter Stephen Day, St George (GB); Richard Francis Grover, Blackheath (GB)

(73) Assignee: BAE SYSTEMS plc, London (GB)

( * ) Notice: Subject to any disclaimer, the term of this patent is extended or adjusted under 35 U.S.C. 154(b) by 277 days.

(21) Appl. No.: 13/387,523

(22) PCT Filed: Jul. 22, 2010

(86) PCT No.: PCT/GB2010/051210
§ 371 (c)(1),
(2), (4) Date: Jan. 27, 2012

(87) PCT Pub. No.: WO2011/012882
PCT Pub. Date: Feb. 3, 2011

(65) Prior Publication Data
US 2012/0122486 A1    May 17, 2012

(30) Foreign Application Priority Data

Jul. 28, 2009   (EP) .................................. 09275054
Jul. 28, 2009   (GB) ................................. 0913078.2

(51) Int. Cl.
*G05D 1/00*    (2006.01)
*G05D 1/02*    (2006.01)

(52) U.S. Cl.
CPC ...... *G05D 1/0278* (2013.01); *G05D 2201/0207* (2013.01); *G05D 1/024* (2013.01); *G05D 1/028* (2013.01); *G05D 1/0272* (2013.01); *G05D 1/0274* (2013.01); *G05D 1/0257* (2013.01)
USPC ............................. 701/489; 701/469; 701/512

(58) Field of Classification Search
CPC ............ G01S 1/02; G01S 1/022; G01S 1/08; G01S 1/20; G01S 5/14; G01S 13/86; G01S 5/16; G01S 13/88; G01S 13/883
USPC .................. 701/469, 468, 489, 494, 495, 512
See application file for complete search history.

(56) References Cited

U.S. PATENT DOCUMENTS

| | | | |
|---|---|---|---|
| 6,408,245 B1 | 6/2002 | An et al. | |
| 8,326,532 B2 * | 12/2012 | Kmiecik et al. | 701/472 |
| 2005/0065727 A1 * | 3/2005 | Hu et al. | 701/214 |
| 2008/0091352 A1 | 4/2008 | O'Hare | |
| 2008/0154495 A1 | 6/2008 | Breed | |

FOREIGN PATENT DOCUMENTS

| | | |
|---|---|---|
| EP | 1 742 084 A1 | 1/2007 |
| WO | WO 2008/075002 A1 | 6/2008 |

OTHER PUBLICATIONS

International Search Report (PCT/ISA/210) issued on Oct. 6, 2010, by British Patent Office as the International Searching Authority for International Application No. PCT/GB2010/051210.

(Continued)

*Primary Examiner* — Richard Camby
(74) *Attorney, Agent, or Firm* — Finch & Maloney PLLC

(57) ABSTRACT

A method/system for estimating a state of a device and at least one target in an environment. The process involves computing a state vector using an error state form of the position of the device in a local coordinate reference frame.

11 Claims, 4 Drawing Sheets

(56) References Cited

OTHER PUBLICATIONS

Written Opinion (PCT/ISA/237) issued on Oct. 6, 2010, by British Patent Office as the International Searching Authority for International Application No. PCT/GB2010/051210.
Search Report issued on Dec. 3, 2009, by European Patent Office for Application No. 09275054.6.
Search Report issued on Nov. 23, 2009, by British Patent Office for Application No. 0913078.2.
Search Report issued on May 7, 2010, by British Patent Office for Application No. 0913078.2.
Moore et al., "Simultaneous Global and Local State Estimation for Robotic Navigation", Int. Conf. on Robotics and Automation, May 2009, pp. 3794-3799.
Marks et al., "Gamma-SLAM: Visual SLAM in unstructured enviornments using variance grid maps", Journal of Field Robotics, Special Issue on LAGR Program, Jan. 2009, pp. 26-51, Part I, vol. 26, No. 1.

* cited by examiner

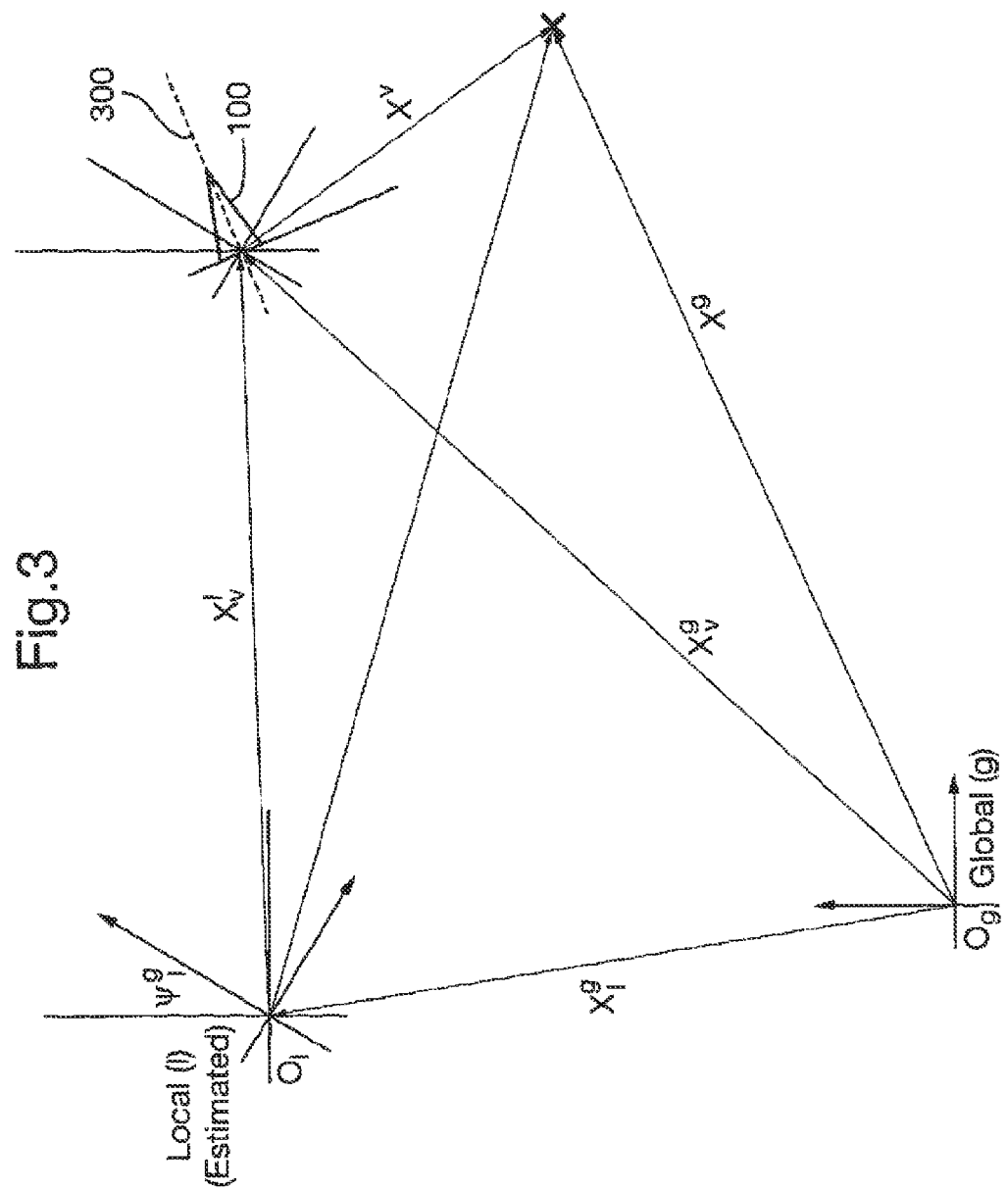

ESTIMATING POSITIONS OF A DEVICE AND AT LEAST ONE TARGET IN AN ENVIRONMENT

BACKGROUND TO THE INVENTION

The present invention relates to estimating a position of a device in an environment and to estimating positions of a device and at least one target.

Autonomous planning of vehicular manoeuvres often involves two distinct types of information in order to estimate the position of a vehicle and objects in its vicinity. Global information is provided in a fixed coordinate system external to the vehicle, e.g. the coordinate system used by GPS, and local information is provided with respect to a coordinate system that can move with the vehicle. At its simplest, global information is data provided by "external" systems where a shared reference frame is required to communicate the data, while local information is available in a relative form and may need no external reference knowledge.

Traditional approaches map the local information into global coordinates and use that information to achieve tasks such as mapping, or planning and executing manoeuvres. Thus, several different coordinate systems may need to be handled: the global coordinate system, a local frame coordinate system that is attached to and moving with the vehicle and/or a local-aligned frame coordinate system that moves with the vehicle, but remains parallel to the global frame at all times.

DESCRIPTION OF THE PRIOR ART

In the known Simultaneous Localisation and Mapping (SLAM) algorithm (see, e.g., Durrant-Whyte, H. and Bailey, T. (2006a) "*Simultaneous Localization and Mapping: Part I*", IEEE Robotics and Automation Magazine, June 2006, pp 99-108) the location of a number of landmarks and the vehicle position are simultaneously estimated with respect to a fixed global coordinate frame. Since the landmark locations and the vehicle position are simultaneously observed when local measurements are made, correlations provided by use of the SLAM algorithm are available (up to the linearization errors introduced by the Extended Kalman Filter (EKF) often used to implement the algorithm). In addition to local measurements being optimally combined, additional aiding sensors such as GPS can be used to directly observe the global vehicle location (and since the vehicle location is correlated to the landmarks this also reduces the marginal global uncertainties for the landmark positions). Importantly, the relative positions of the landmarks are known with monotonically decreasing uncertainty, even when their global marginal uncertainties may grow arbitrarily. Likewise, since the vehicle location is correlated to the landmark positions as an effect of the observation process, the relative position of landmarks to the vehicle will always be better than the difference between their marginal global locations.

One of the most significant disadvantages of using a SLAM-type approach to maintain the information is that the computational complexity increases as a function of the square of the number of landmarks, and the EKF eventually (and necessarily) introduces inconsistencies in the estimates. While this may be sufficient for a relatively simple, structured environment, operation in a complex environment is unlikely to be computationally feasible. This has a particularly notable impact when the SLAM algorithm is used directly as an estimator of the location of the vehicle within a guidance and control loop. In this case the control loop is limited to a maximum rate that will be determined by the update rate of the SLAM algorithm, resulting in decreased control performance as the environmental representation becomes increasingly complex, which is in direct conflict with desired characteristics.

The impact of the accuracy and stability of an estimate on the performance of a general system, e.g. when used in controlling a vehicle, can be summarised according to the following effects:

1. Any error in the sensing system, e.g. sensing any observable effect, will correspond to the addition of a corresponding error to the output behaviour of the system. More generally, errors in the estimated value, for example when the mean of a distribution is used, will appear more directly in the system behaviours, e.g. an offset in a feedback control sensor will cause an offset in the controlled value.
2. If the sensing subsystem corrects its current estimate (when the property itself is unchanged or changing slowly with respect to the controller update rate) then this is appears as a step change in the demand on the Error Controller (cascade compensator). More generally, updates to the distribution when interpreted by the system as the best estimate given may appear as step changes in that estimate, even when the property itself is unchanged or varying slowly compared to the update rate of the estimation.

The first of these effects is intuitive and commonly recognised. The second, however, causes a far more subtle impact on designing for reliable systems. Take, for example, a control system utilising a Kalman Filter to generate the estimated quantity and which incorporates an observation that causes a significant change in the estimated mean of the value. This may occur if the prior has a large variance and an accurate measurement has become available, for example GPS signals have been re-acquired in an INS/GPS system. While the filter itself consistently interprets this change, a downstream system (such as a cascade compensator) utilises only the mean value (estimate) and will see the step change in value applied to the feedback terms.

In terms of the control system, the effect of such a step change on the measurement is the application of an equal step (of the opposite sign) to the error input of the cascade controller.

Embodiments of the present invention are intended to address at least some of the problems discussed above.

SUMMARY OF THE INVENTION

According to a first aspect of the present invention there is provided a method of estimating a position of a device and at least one target in an environment, the method including computing a state vector defined by:

a vector representing a position of the device with respect to an origin of a global coordinate reference frame;

a vector representing an estimated position of the at least one target with respect to an origin of an estimated local coordinate reference frame, and an error state form based on a difference between the origin of the estimated local coordinate reference frame and an origin of a correction-free local coordinate reference frame in which a position of the device is assumed to be error-free.

The position of the origin of the estimated local coordinate reference frame relative to an origin of the global coordinate reference frame may be known/estimated. A position of the origin of the correction-free local coordinate reference frame relative to the origin of the estimated local coordinate reference frame may be known/estimated. The state vector computed can result in the data contained in the local reference frame being robust to the effects of global corrections, but still maintained consistently with respect to those corrections.

The position of the device in the correction-free local coordinate frame can be formally independent of estimated quantities used in state vector computation.

If the origin of the global coordinate reference frame is not co-incident with the origin of the estimated local coordinate frame then the vector state may further be defined by a vector describing relative positions of these origins.

The computation of an estimate of the state vector may implement a SLAM-type algorithm. The SLAM-type algorithm may involve an Extended Kalman filter.

According to another aspect of the present invention there is provided a method of estimating a position of a device and at least one target in an environment, the method including computing a state vector defined by:

a vector representing a position of the device with respect to an origin of an estimated local coordinate frame associated with the device;

a vector representing an estimated position of the at least one target with respect to the origin of the estimated local coordinate reference frame, and an error state form based on a difference between an origin of the estimated local coordinate reference frame and an origin of a correction-free local coordinate reference frame in which a position of the device is assumed to be error-free.

According to a further aspect of the present invention there is provided a method of estimating a position of a device with respect to a global coordinate reference frame, the method including:

defining a correction-free local coordinate reference frame associated with the device;

defining an estimated local coordinate reference frame associated with the device;

receiving error-free device position information describing position of the device with respect to the error-free local coordinate reference frame;

receiving information defining an error term based on a difference between the error-free device position and an estimate of the position of the device with respect to the estimated local coordinate reference frame;

computing a vector representing the position of the device with respect to a global coordinate reference frame based on sum of a vector based on the received device position and the error term.

According to another aspect of the present invention there is provided a method of estimating a position of a device with respect to a global coordinate reference frame, the method including:

defining a correction-free local coordinate reference frame associated with the device;

defining an estimated local coordinate reference frame associated with the device;

receiving error-free device position information describing position of the device with respect to the error-free local coordinate reference frame;

receiving information describing an error term based on a difference between an origin of the error-free coordinate reference frame and an origin of the estimated coordinate reference frame;

computing a vector representing the position of the device with respect to a global coordinate reference frame based on sum of a vector based on the received device position and the error term.

According to yet another aspect of the present invention there is provided a computer program product comprising a computer readable medium, having thereon computer program code means, when the program code is loaded, to make the computer execute a method of estimating a state of a device and at least one target in an environment (and a method of estimating a position of a device with respect to a global coordinate reference frame) substantially as described herein.

According to another aspect of the present invention there is provided apparatus configured to estimate a position of a device and at least one target in an environment, the apparatus including a device configured to compute a state vector defined by:

a vector representing a position of the device with respect to an origin of a global coordinate reference frame;

a vector representing an estimated position of the at least one target with respect to the origin of an estimated local coordinate reference frame, and an error state form based on a difference between an origin of the estimated local coordinate reference frame and an origin of a correction-free local coordinate reference frame in which a position of the device is assumed to be error-free.

The apparatus may include at least one sensor taking measurements relative to the device, e.g. distance to a said target. The sensor may include a RADAR or LI DAR device. The at least one sensor and/or the processor device will typically be mounted onboard the device.

The apparatus may further include a device for receiving information relative to the global coordinate reference frame, for example a device configured to receive a GPS locating signal.

According to an alternative aspect of the present invention there is provided a vehicle including apparatus configured to estimate a position of a vehicle and at least one target in an environment substantially as described herein.

According to yet another aspect of the present invention there is provided a method of estimating a state of a device and at least one target in an environment, the method including computing a state vector of a device and at least one target using an error state form of a position of the device in a local coordinate reference frame.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DETAILED DESCRIPTION OF THE INVENTION

The invention may be performed in various ways, and, by way of example only, embodiments thereof will now be described, reference being made to the accompanying drawings in which:

FIG. 3 shows a construction including an estimated local coordinate reference frame and a global coordinate reference frame;

Figure 1:
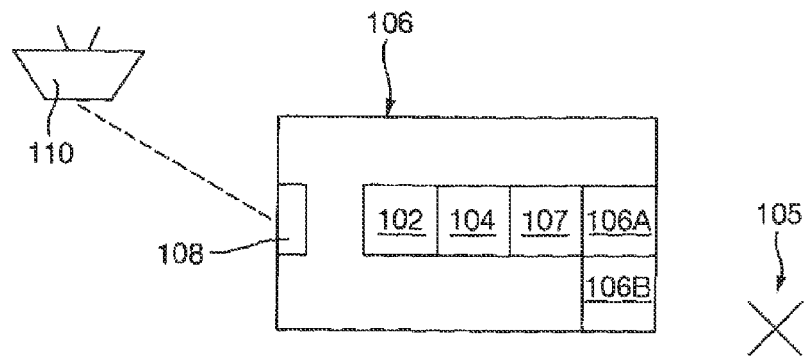
FIG. 1 is a block diagram of a vehicle fitted with at least one onboard sensor.

FIG. 1 shows a vehicle 100 that is fitted with a computing device including a processor 102 and memory 104. The vehicle will also include other conventional features, e.g. steering and traction components, and may be at least partially automated, or can include a planning system for assisting a human operator. The vehicle will also typically include communications devices for communicating with external systems, including other vehicles. It will be appreciated that a vehicle is only one example of a device that can be used to estimate the position of at least one target in an environment. In alternative embodiments, the device can comprise a handheld tracking unit with a display for indicating the position of the target(s) to a user, or the device may be incorporated into another type of mechanism.

The vehicle 100 is further fitted with at least one local onboard sensor. In the example the vehicle has a first local sensor 106A and a second local sensor 106B. The local sensors are configured to take measurements relative to the vehicle, typically to obtain information regarding obstacles/object (which may be static or moving) in the vicinity of the vehicle. Such obstacles/objects shall be called "targets" herein and an example is shown schematically at 105, but it will be understood that a target is not necessarily something at which a weapon is to be fired. Examples of suitable local sensors include RADAR and/or LIDAR type devices and the sensors can produce information regarding the range and/or angle to an object in the environment, but other types of output could be produced, e.g. estimated velocity of a moving object. This information is normally presented with respect to a local coordinate system based on the current position of the vehicle.

In the example, the second local sensor 106B can be configured to take a measurement relating to how the vehicle has moved with respect to where it was previously located, but it will be understood that in some cases this information can be measured by a single local sensor device in combination with sensing objects in the environment. The output provided by the local sensor 106B may be in the form of velocity and turn-rate, acceleration, etc. Alternatively, the computing device onboard the vehicle 100 may be configured to store and process data relating to a model 107 that is intended to estimate the same types of measurements as the second local sensor 106B above. The skilled person will be familiar with processes such as inertial or constant-velocity models that can be used for this purpose.

The vehicle 100 further includes a device 108 for receiving global information. A typical example of this type of information comprises GPS or LORAN (LOng Range Aid to Navigation) that provides an estimate of the location of the vehicle 100 with respect to a global coordinate system, transmitted by an external system 110.

Figure 2A:
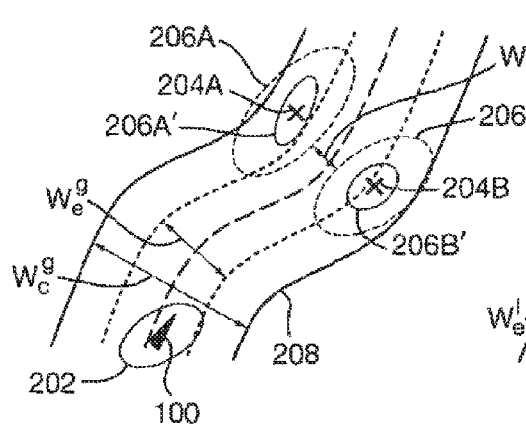
FIGS. 2A and 2B illustrate schematically a vehicle using global and local measurements, respectively, in the context of path-based motion control.
Figure 2B:
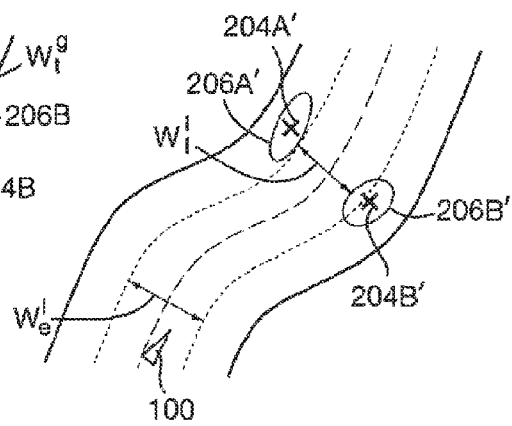

The approach used by the embodiments described herein can take advantage of the additional finesse that is made available for tasks by separating the fine-scale motions of the device with respect to local features from the global pose uncertainty. For example, it is not necessary to consider the global location of a vehicle and some gate-posts when navigating through a narrow opening; rather, it can be sufficient to know where the gate-posts are located with respect to the vehicle. FIGS. 2A and 2B illustrate qualitative differences between the two approaches. In these Figures the obstacles lie off the global plan (i.e. route traversal will not require reactive deviations from that path), e.g. the planned route is clear of unexpected obstacles such as a parked car in the carriageway.

In FIG. 2A uncertainty in the location of vehicle 100 is represented by the solid black ellipse 202 and the targets 204A, 204B are sensed with the uncertainties shown in fainter/grey ellipses to identify them as a local effect. The resulting marginal uncertainty in the global location of the obstacles is shown by the two dotted black ellipses 206A, 206B. Also shown is the corridor width $w_c^g$, the effective width, $w_e^g$, and the resulting traversable width, $w_t^g$. The effective width is the remaining width after the application of the vehicle's global uncertainty to the edges of the corridor 208. In FIG. 2B, however, the global uncertainty is not mapped onto the obstacle locations so while the effective corridor width remains the same ($w_e^l = w_e^g$) the traversable width $w_t^l$ is greatly increased. In this case the ellipses 206A' and 206B' represent the marginal local uncertainties. To generalise, 206A, 206B in FIGS. 2A and 2B represent the marginal uncertainties in the frame of reference global in FIG. 2A and local in FIG. 2B.

In FIG. 2A the control (or mapping, planning, etc) is performed in the global space with respect to the global, marginal uncertainties. The corridor defines a width $w_c^g$ and the nominal trajectory is shown as a dotted line. Global pose (position and orientation) uncertainty defines the effective corridor width, $w_e^g$, as the narrow region in which a valid global path exists at the current pose uncertainty. That is, even if the estimate of the vehicle was "worst case" with respect to this uncertainty then the vehicle would still remain within the pre-defined corridor. The two targets 204A', 204B' and their uncertainty in location with respect to the vehicle (based on local measurements giving the local marginal uncertainty) is shown by the two small, grey ellipses 206A', 206B'. The obstacle observations are then mapped into the global space, resulting in the larger, black, dotted ellipses 206A, 206B. A vehicle controller is required for planning navigation through on opening of traversable width $w_t^g$, which is substantially narrower than the original corridor.

In FIG. 2B the control is performed in the local space. The local effective corridor width, $w_e^l$, is the same as for the global case. Knowledge of the location of the obstacles with respect to the vehicle; however, is improved and they are known to the accuracy of the sensory information (again shown by faint/grey ellipses 206A', 206B'); this results in a clear improvement in the traversable width $w_t^l$.

In FIG. 2A the uncertainties represented are the marginal projections of the global locations; this must be conservative as the global frame is used (and not the local frame where the differences are taken). FIG. 2B uses the local frame and so only the relative uncertainty remains for local data; the global data, however, requires the global position of the vehicle to be subtracted from it. Purely global data (that is, data which does not depend on the current vehicle position) will have no correlation to the vehicle position and the marginal projection is used in exactly the same was as in FIG. 2A. If the global map has simultaneously estimated the vehicle position and the location of objects within the environment, then it should be possible to derive the local map from the global data.

In the construction shown in FIG. 3, it is assumed that the local estimated coordinate reference frame (l) is defied relative to the vehicle (but not any external reference), which represents a special-case of a generic local coordinate frame where the vehicle position, as well as objects within the environment, are represented with respect to an arbitrary local coordinate system (local in the sense that no additional information is needed for the vehicle to use the data; that information would be necessary to communicate the data to another device). The construction represents the vehicle and environmental locations ($x_v^*$ and $x^*$ respectively) in a local coordinate frame (l) in addition to the global frame (g). Also shown is a vehicle frame 300. If the statistical dependencies are known between the data in the local frame and the data in the global frame (and equivalently between the local and vehicle frames), then it is possible to convert between the different representations without loss of information.

As noted above, estimator corrections (such as those involving sensors used within a control system) can result in apparent step-changes in non-statistical downstream devices' (e.g. for control) error-terms and will necessarily reduce the stability and controllability of the composite system. This suggested to the present inventors that applications sensitive to such effects should be attempted in a space that is "correction-free". It can be demonstrated that the only way in which an estimated quantity can be prevented from being updated following an observation is to have enforced null-dependency with all observed quantities, such as zero-correlation in a Kalman filter. If this is not true, then an update of any dependent quantity will necessarily result in a non-zero impact on the "correction-free" quantity and its value will change.

It is desired that the vehicle's local position, $x_v^l$, be "correction-free" so that estimates in the local frame achieve the desired continuity properties. If this is done, however, then the vector construction would no longer hold: $x_v^l$ would no longer correspond to $x_v^g - x_l^g$. Regardless of how the estimator is constructed, using this scheme to keep the local position correction-free must result in the local position being stored in a manner that is uncorrelated with the global positions and this inconsistency will be the result.

Figure 4:
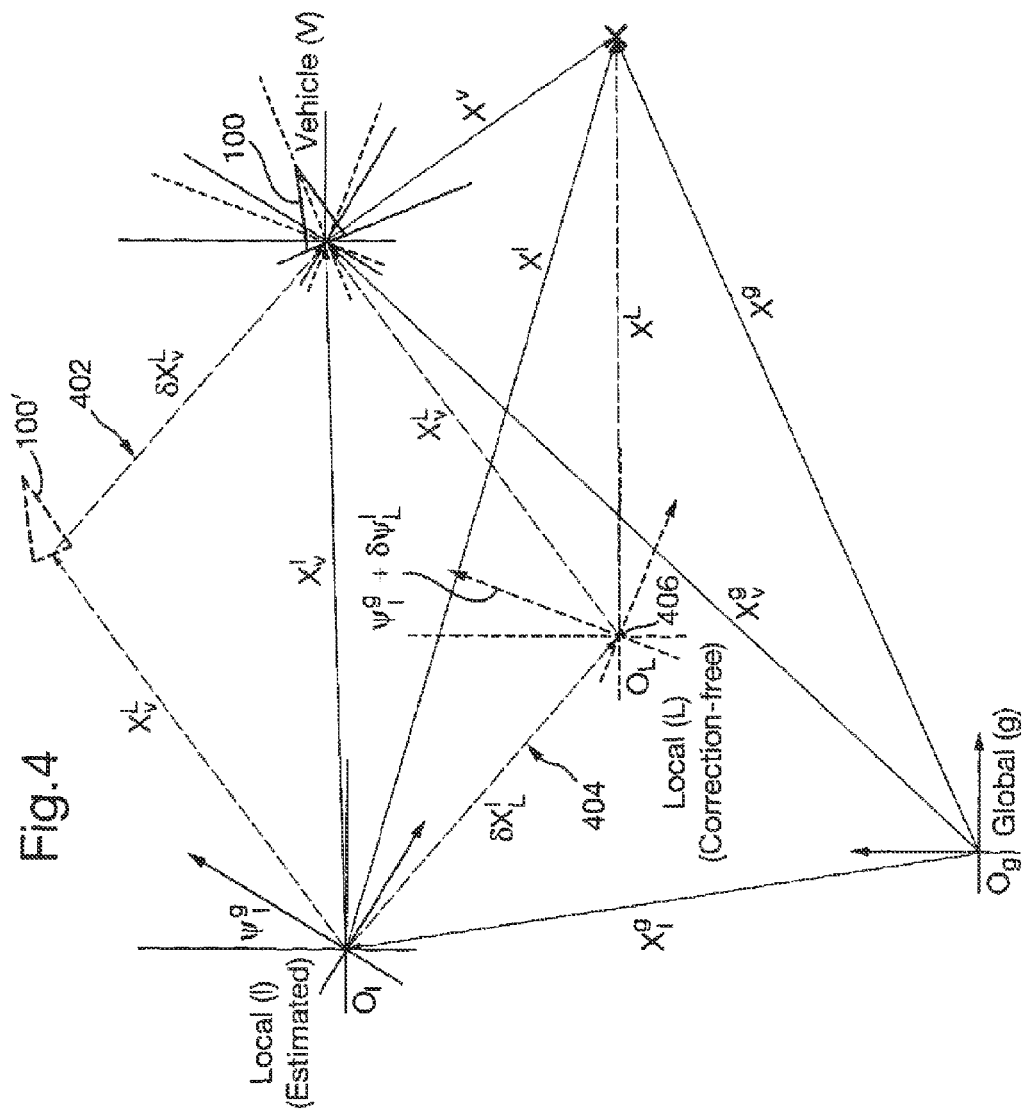
FIG. 4 shows a construction including an "error-free" local coordinate reference frame.

FIG. 4 shows a construction that is intended to address the inconsistency described above with reference to FIG. 3 whilst maintaining a useful continuous control space (in which the corrections do not occur) and illustrates the development of a "Correction-free" Local frame. It is firstly assumed that the vehicle position in the local frame is known perfectly. This assumed "error-free" local position is denoted by $x_v^L$ and is represented in FIG. 4 by a dashed outline 100' of the vehicle. The solid line construction in FIG. 4 is the same as that shown in FIG. 3.

As noted above, this error-free position will be inconsistent with the estimated local position, $x_v^l$ and this difference is denoted by the error term $\delta x_v^L$. Thus, this true local position (relative to the "estimated local frame") can be seen to correspond to the vector sum of this error-free quantity and an appropriate error term, $\delta x_v^L$, which gives rise to the upper dashed triangle 402 in FIG. 4. The error-term (rather than the estimate $x_v^L$) can be maintained along with the local frame position and the global position and the vector sum involving these quantities and the error-free position will remain consistent. If the error term is appropriately estimated along with the vehicle's local position, the local frame's global position and the vehicle's global position, then the following vector sum remains consistent:

$$x_v^g = x_l^g + x_v^L + \delta x_v^L$$

This implies that the error-free location can remain correction-free while the estimation scheme remains consistent in the global frame. An alternative interpretation of the error-free position will now be considered. The vector parallelogram (the lower dashed triangle 404 in FIG. 4) is constructed with sides equal to the error-free position and the local position error-term. The lower apex 406 defines the origin of the "Correction-free" Local Frame (L) in which the vehicle position is without error, $x_v^L$. The vector parallelogram (dashed lines) is constructed so that the "correction-free" position now corresponds to the actual position of the vehicle, where the local reference frame position in the global frame has an error $\delta x_L^l$ equal to the local position error-term in the upper triangle 402. In order to maintain the consistency of an equation analgous to the one above, the last side of the parallelogram should be recognised as the error of the location of the Correction-free Local frame (L) in the Estimated Local frame (l); by definition this will be equivalent to the position error-term in the estimated local frame, $\delta x_L^l = \delta x_v^L$.

A one-dimensional analogue of the construction described above will be considered below using the global SLAM problem ("traditional SLAM"), and then followed using the Correction-free Local Frame.

In the global SLAM Model the state vector will be defined by:

$$x = [x_v^g \ x_t^g]^T \quad (1)$$

Assume a simple dynamics model where the update equations for the system are given by:

$$x_{k|k-1} = F x_{k-1|k-1} + G u_k \quad (2)$$

$$P_{k|k-1} = F P_{k-1|k-1} F^T + G Q_k G^T \quad (3)$$

$$x_{k|k} = x_{k|k-1} + W_k(z_k - H x_{k|k-1}) \quad (4)$$

where the Kalman gain ($W_k$) is given by $W_k = P_{k|k-1} \nabla h^T S_k^{-1}$, and using the following models:

$$F = \begin{bmatrix} 1 & 0 \\ 0 & 1 \end{bmatrix} \quad (5)$$

$$G = \begin{bmatrix} 1 \\ 0 \end{bmatrix} \quad (6)$$

$$u_k = u_k, \ Q_k = q_k \quad (7)$$

$$H = [-1 \ 1] \quad (8)$$

$$z_k = z_k, \ R_k = r_k \quad (9)$$

The initial covariance matrix for this example is derived from the definition of the target position, $x_t^g = x_v^g + x_t^v$, and if the initial vehicle uncertainty is $P_{vv}$ and the measurement error is given by $r_k$ then the covariance is given by the SLAM model ("*Simultaneous Localization and Mapping: Part II*", IEEE Robotics and Automation Magazine, September 2006, pp 108-117, Equation 7) as, $$P_0 = \begin{bmatrix} P_{vv} & P_{vv} \\ P_{vv} & P_{vv} + r_k \end{bmatrix} \quad (10)$$

In the Correction-free Local Frame SLAM Model, the state vector will be defined by:

$$x = [x_v^g \ x_t^g \ \delta x_v^L \ x_t^L]^T \quad (11)$$

where the correction-free position is not part of the estimation scheme as it is considered deterministically. Assume a simple dynamics model where the update equations for the system are given by Equations (2)-(4) above. The following models are used:

$$F = I_4 \quad (12)$$

$$G = \begin{bmatrix} 1 & 0 & 0 & 0 \\ 1 & 0 & 1 & -1 \end{bmatrix}^T \quad (13)$$

$$u_k = \begin{bmatrix} u_k \\ \delta u_k \end{bmatrix}, Q_k = \begin{bmatrix} 0 & 0 \\ 0 & q_k \end{bmatrix} \quad (14)$$

$$H = [\,-1 \quad 1 \quad 1 \quad 1\,] \quad (15)$$

$$z_k = z_k,\ R_k = r_k \quad (16)$$

where: $I_4$ is the [4×4] identity matrix; the vector $u_k$ has components $u_k$ and $\delta u_k$ corresponding to the model's true input and error, respectively; and the observation is made of the target location in the error-free local frame.

In this case, the initial covariance matrix is constructed using the two relationships: $x_f^g = x_v^g - x_v^I$ where the initial local uncertainty is $P_{II} = 0$ (the frame is located deterministically with respect to the current vehicle position) and the global vehicle uncertainty is $P_{gg}$; and $x_t^{L=x} {}_v^L + x_t^v$, with the error-free position known exactly and the measurement error given by $r_k$. The resulting covariance is, $$P_0 = \begin{bmatrix} P_{gg} & P_{gg} & 0 & 0 \\ P_{gg} & P_{gg} & 0 & 0 \\ 0 & 0 & 0 & 0 \\ 0 & 0 & 0 & r_k \end{bmatrix} \quad (17)$$

Note that the global SLAM construct can be derived from the error-free local version using the following 'observation' mechanism:

$$x_{global} = H_{global} x_{local} \quad (18)$$

$$P_{global} = H_{global} P_{local} H_{global}^T \quad (19)$$

$$H_{global} = \begin{bmatrix} 1 & 0 & 0 & 0 \\ 0 & 1 & 1 & 1 \end{bmatrix} \quad (20)$$

which can be readily verified using FIG. 4.

Observation of the global vehicle position can readily be incorporated into this model using the observation mechanism:

$$z_v^g = H_v^g x \quad (21)$$

$$P_v^g = (H_v^g) P (H_v^g)^T \quad (22)$$

$$H_v^g = [1\ 0\ 0\ 0] \quad (23)$$

Figure 5A:
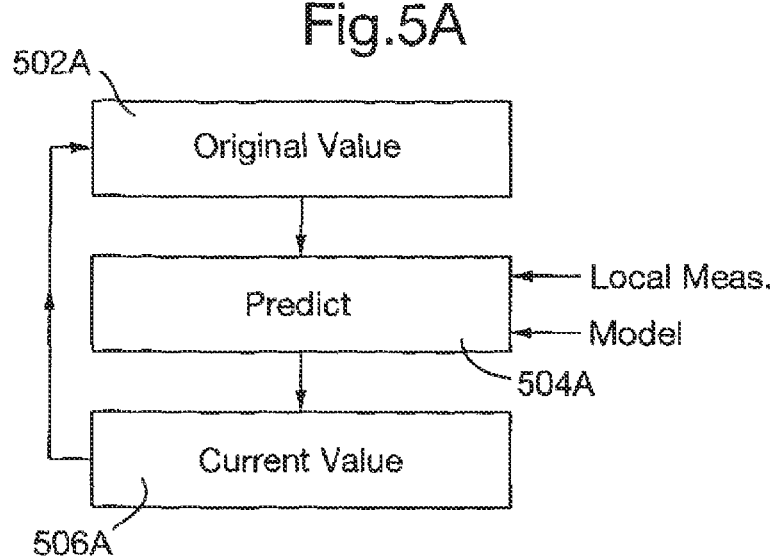
FIGS. 5A and 5B are flowcharts showing operations performed by computing device onboard the vehicle in order to estimate positions of the vehicle and at least one target.
Figure 5B:
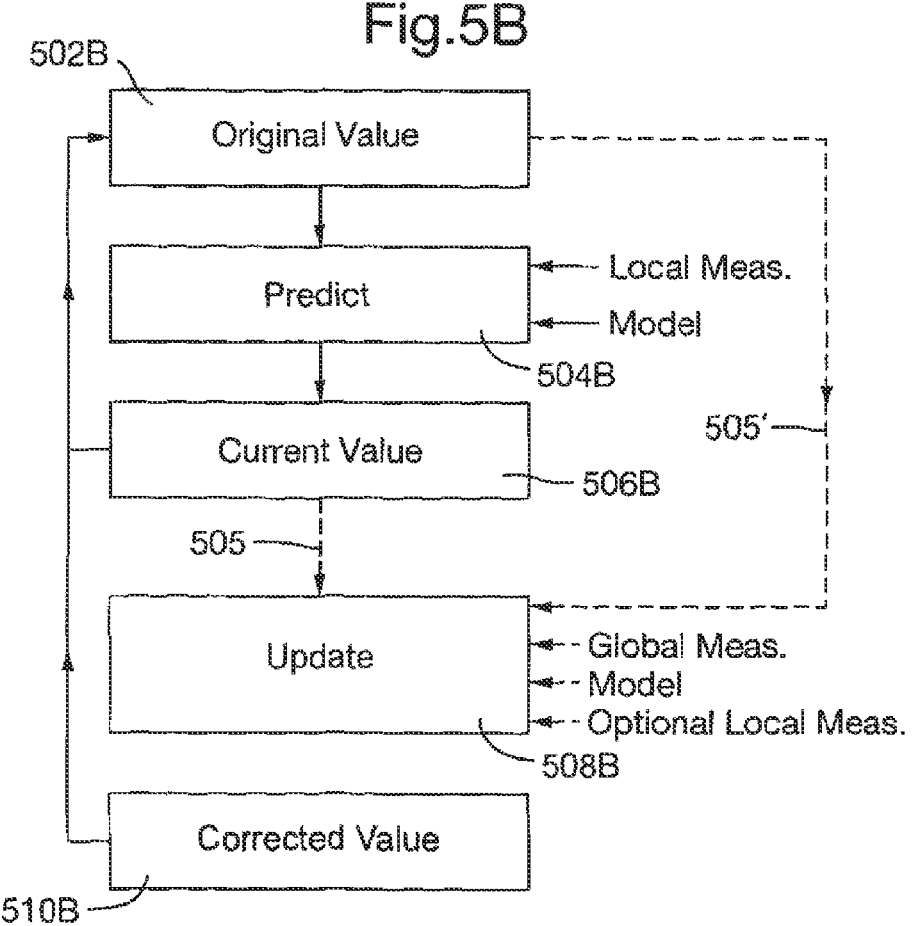

FIGS. 5A and 5B illustrate steps performed by the computing device onboard the vehicle 100 in order to implement the computations described above to generate state information, which can include an indication of the location (e.g. X, Y coordinates with respect to the global coordinate system, although other types of positional information could be generated) of the vehicle as well as one or more targets in the environment. The overall computation can be divided into a correction-free part (involving a computation of the position of the vehicle/target(s) with respect to the local frame that is assumed to be error-free) and an estimated part. In some embodiments, more than one processor may be used to perform the computations. It is also possible for at least part of the computation to be performed remotely, with the result being transmitted to a processor onboard the vehicle for further processing, e.g. implementing a vehicle manoeuvre.

FIG. 5A shows steps performed in connection with the error-free part of the process. At step 502A data representing the initial/previous value of the state is obtained. Here, the state is considered to be the error-free position of the vehicle and target(s) with respect to the correction-free local frame coordinate system because it is based on a measurement of the vehicle/target(s) positions that is assumed to be correct. At step 504A that data is used by a prediction process, e.g. a predict step from a Kalman filter (alternatively, Extended Kalman Filter, Particle Filter or Bayes Filter could be used), in most cases along with a measurement taken by the at least one local sensor (e.g. 106A, 106B) fitted on the vehicle and the prediction model 107. Alternatively, the information may be obtained from a global sensor, e.g. 108. The measurement typically comprises an indication of the position of the vehicle/target(s) in terms of the local coordinate system and, again, is considered to be error-free. At step 506A data representing the current state output by step 504A is obtained and control returns to step 502A, with the current state replacing the previous state. The values involved in the process of FIG. 5A have uncertainty, but the process does not track/deal with this uncertainly; instead, this is done by the process of FIG. 5B.

Turning to FIG. 5B, at step 502B data representing the initial/current state is obtained. Here, the state is an estimate of the position of the vehicle with respect to the global frame coordinate system and will include an element of uncertainty. At step 504B that data is used in a prediction process, e.g. the predict step of a Kalman filter, along with a measurement taken by the at least one local sensor (e.g. 106A, 106B, which may include an inertial unit or the like) and the prediction model 107. Alternatively, the information may be obtained from a global sensor, e.g. sensor 108. At step 506B data representing the current state output by step 504B is obtained and control may return to step 502B, with the current state replacing the previous state.

Step 508B shows an update process that uses a measurement received via the device 108 for receiving global information and the prediction model 107. Alternatively, the information may be obtained from at least one local data-obtaining sensor, e.g. sensor 106A or 106B, which may include a laser scanner or the like. This may take place following a prediction cycle of step 506B (before control returns to step 502B), as depicted by arrow 505, or asynchronously as depicted by arrow 505'. At step 510B an updated value is obtained and control returns to step 502B, with the updated state replacing the previous state.

The invention claimed is:

1. A method of estimating a position of a device (and at least one target in an environment, the method including computing a state vector defined by:
   a vector representing a position of the device with respect to an origin of a global coordinate reference frame;
   a vector representing an estimated position of the at least one target with respect to an origin of an estimated local coordinate reference frame; and
   an error state form based on a difference between the origin of the estimated local coordinate reference frame and an origin of a correction-free local coordinate reference frame in which a position of the device is assumed to be error-free,
   wherein the state vector is based on a correction-free local frame simultaneous localization and mapping (SLAM)

model, and wherein computing the state vector includes deterministically deriving the error-free position of the device.

2. A method according to claim 1, wherein the position of the device in the correction-free local coordinate frame is formally independent of estimated quantities used in the state vector computation.

3. A method according to claim 1, wherein if the origin of the global coordinate reference frame is not co-incident with the origin of the estimated local coordinate frame then the vector state is further defined by a vector describing relative positions of these origins.

4. A method of estimating a position of a device and at least one target in an environment, the method including computing a state vector defined by:
   a vector representing a position of the device with respect to an origin of an estimated local coordinate frame associated with the device;
   a vector representing an estimated position of the at least one target with respect to an origin of the estimated local coordinate reference frame; and
   an error state form based on a difference between the origin of the estimated local coordinate reference frame and an origin of a correction-free local coordinate reference frame in which a position of the device is assumed to be error-free,
   wherein the state vector is based on a correction-free local frame simultaneous localization and mapping (SLAM) model, and wherein computing the state vector includes deterministically deriving the error-free position of the device.

5. A computer program product comprising a tangible computer readable medium, having thereon computer program code, when the program code is loaded, to make the computer execute a method of estimating a state of a device and at least one target in an environment according to claim 1.

6. Apparatus configured to estimate a position of a device and at least one target in an environment, the apparatus including a device configured to compute a state vector defined by:
   a vector representing a position of the device with respect to an origin of a global coordinate reference frame;
   a vector representing an estimated position of the at least one target with respect to an origin of an estimated local coordinate reference frame; and
   an error state form based on a difference between the origin of the estimated local coordinate reference frame and an origin of a correction-free local coordinate reference frame in which a position of the device is assumed to be error-free,
   wherein the state vector is based on a correction-free local frame simultaneous localization and mapping (SLAM) model, and wherein computing the state vector includes deterministically deriving the error-free position of the device.

7. Apparatus according to claim 6, including at least one sensor for taking measurements relating to a said target in a vicinity of the device.

8. Apparatus according to claim 7, wherein the at least one sensor is mounted onboard the device.

9. Apparatus according to claim 6, including:
   a device for receiving information relative to the global coordinate reference frame.

10. Apparatus according to claim 9, wherein the device for receiving global information is configured to receive a GPS locating signal.

11. The apparatus according to claim 6, in combination with a vehicle.

* * * * *